United States Patent [19]

Matsuura

[11] Patent Number: 5,670,843
[45] Date of Patent: Sep. 23, 1997

[54] PLASMA ADDRESSED DISPLAY DEVICE

[75] Inventor: Kiyoshige Matsuura, Tokyo, Japan

[73] Assignee: Sony Corporation, Tokyo, Japan

[21] Appl. No.: 566,172

[22] Filed: Dec. 1, 1995

[30] Foreign Application Priority Data

Dec. 2, 1994 [JP] Japan .................. 6-329449

[51] Int. Cl.$^6$ .............. H01J 17/49; H01J 17/16; H01J 61/30; H01J 9/26
[52] U.S. Cl. ............. 313/582; 313/493; 313/634; 156/106; 445/25
[58] Field of Search .................. 313/484, 491, 313/493, 582, 634; 156/106; 445/25

[56] References Cited

U.S. PATENT DOCUMENTS

| | | | |
|---|---|---|---|
| 4,526,818 | 7/1985 | Hoshikawa et al. | 156/106 |
| 5,270,613 | 12/1993 | Kim | 313/493 |
| 5,349,455 | 9/1994 | Hayashi et al. | 313/582 |
| 5,420,707 | 5/1995 | Miyazaki | 313/582 |

*Primary Examiner*—Sandra L. O'Shea
*Assistant Examiner*—Joseph Williams
*Attorney, Agent, or Firm*—Hill, Steadman & Simpson

[57] ABSTRACT

A plasma addressed display device comprising a display cell comprising a first substrate having transparent electrodes arranged in a column on an inner surface, a microsheet glass adhered at a gap to the first substrate and a liquid crystal layer held in the gap and a plasma cell comprising a second substrate having discharge electrodes arranged in a row and a plurality of barrier ribs to an inner surface and an ionizable gas sealed between the second substrate and the microsheet glass, wherein the second substrate is adhered to the lower surface of the microsheet glass by way of a bonding material disposed between barrier ribs situated to the outer side and barrier ribs situated to an inner side thereof, the first substrate is adhered to the upper surface of the microsheet glass by way of an adhesive material disposed being aligned with the bonding material, and the adhesive material has such a sealing width as extending over the sealing width of the bonding material and extending for the distance between the barrier rib situated outer side and the barrier rib situated inner side. The strength of the microsheet glass separating the plasma cell and the display cell is compensated by the adhesive material.

8 Claims, 2 Drawing Sheets

PLASMA ADDRESSED DISPLAY DEVICE

BACKGROUND OF THE INVENTION

1. Field of the Invention

The present invention relates to a plasma addressed display device having a flat panel structure in which a display cell and a plasma cell are stacked and more specifically to a sealing structure for a display cell.

2. Description of Related Art

A plasma addressed display devices utilizing a plasma cell for addressing of a display cells has been proposed in U.S. Pat. No. 4,896,149 to Buzak (Issue date: Jan. 23, 1990), U.S. Pat. No. 5,077,553 to Buzak (Issue date: Dec. 31, 1991), and U.S. patent application Ser. No. 07/837,861 for an Electro-Optical Device, filed by Shigeki Miyazaki on Feb. 20, 1992. The disclosure of the three above noted references are hereby incorporated herein. As shown in FIG. 3, the plasma addressed display device has a flat panel structure comprising a display cell 101, a plasma cell 102 and microsheet glass 103 interposed between them. The plasma cell 102 comprises the microsheet glass 103 and a lower substrate 104 bonded to the lower surface thereof, in which a ionizable gas is sealed in a gap between both of them. Discharge electrodes 105 are formed in a row on the inner surface of the lower substrate 104. Since the discharge electrodes 105 can be printed and baked on the flat substrate 104, for example, by means of screen printing, they can be formed finer with excellent productivity and workability. Barrier ribs 106 are formed on the discharge electrodes 105 and they divide the gap in which the ionizable gas is sealed to constitute channels. The barrier ribs 106 can also be printed and baked by screen printing and tops of the ribs abut against the lower surface of the microsheet glass. The discharge electrodes 105 in the row function alternately as an anode and a cathode to cause plasma discharge between both of them. The microsheet glass 103 and lower substrate 104 are bonded to each other with a bonding material 107 made, for example, of glass frit. On the other hand, the display cell 101 is constituted with a transparent upper substrate 108. The upper substrate 108 is adhered to the microsheet glass 103 by means of an adhesive material at a predetermined gap, in which a liquid crystal 110 is sealed and filled. For controlling the gap constant, spacer particles 111 are dispersed. Transparent electrodes 112 are formed in a column direction on the inner surface of the upper substrate 108. The transparent electrodes 112 are orthogonal to the discharge electrodes 105 in the row direction. Matrix-like picture elements are defined at intersections between the transparent electrodes 112 and the discharge channels.

In the plasma addressed display device having such a constitution, display driving is conducted by line-to-line scanning of the discharge channels in the row of conducting plasma discharging during switching and applying image signals in synchronization with the scanning to the transparent electrodes 112 facing the display cell 101. When plasma discharge is generated in the discharge channels, the inside is at an anode potential substantially uniformly to select picture elements on every one row. That is, the discharge channel functions as a sampling switch. When image signals are applied on each of the picture elements in a state where the plasma sampling switch is conductive, sampling is effected and the picture elements can be controlled to ON and OFF. The picture or image signals are kept as they are in the picture elements even after the plasma sampling switch becomes non-conductive.

A problem to be solved by the invention will be explained briefly also with reference to FIG. 3. In a case of manufacturing the plasma addressed display device, the plasma cell 102 is at first assembled and then the display cell 101 is assembled thereon. For this purpose, the upper substrate 108 is adhered to the microsheet glass 103 using the adhesive material 109. A pair of openings 113 and 114 are previously formed to the upper substrate 108. A liquid crystal is introduced from the opening 113, the inside is evacuated to about 0.1 Torr through the other opening 114, and the introduced liquid crystal is sucked to the inside. In this way, the liquid crystal 110 is filled in the gap of the display cell 101. A method of placing the entire panel into a vacuum chamber to evacuate the inside, then bringing the inside into contact with the liquid crystal, returning to atmospheric pressure and then injecting the liquid crystal into the gap may be used instead of the above-mentioned liquid crystal injection method. While latter method has often been used in general liquid crystal panels, it is difficult to adopt the latter method in a plasma addressed display panel. That is, since an ionizable gas is previously sealed at a pressure of about 100 Torr in the gap on the side of the plasma cell 102, when the inside of the liquid crystal cell 101 is depressurized to a high vacuum in the vacuum chamber, the plasma cell 102 expands to cause destruction of the microsheet glass 103.

Then, in the plasma addressed display device, the former method is employed, that is, the liquid crystal is introduced from the opening 113, while the inside is evacuated to a relatively low vacuum through the other opening 114. However, also this method involves a problem of causing cracking to the microsheet glass near the frit seal. The problem is to be explained more specifically with reference to FIG. 4. The lower substrate 104 is bonded to the lower surface of the microsheet glass 103 by means of the bonding material 115 such as glass frit. On the other hand, the upper substrate 108 is adhered to the upper surface of the microsheet glass 103 by the adhesive 109 made, for example, of a UV-curable resin or the like. Generally, the sealing width of the bonding material 115 is substantially equal with the sealing width of the adhesive material 109 and they are aligned with each other by way of the microsheet glass 103. Depending on the cell, the adhesive material 109 may situate to the outer side of the bonding material 115. In any case, the height of the bonding material 115 is lower than the barrier rib 107. This is caused by flow out or contraction of the frit seal, deformation of a jig or the like. As a result, the microsheet glass 103 concaves downwardly along the sealing region, to such a state that the spacer particles 111 are no longer effective. Subsequently, when the inside of the gap is evacuated through the opening 114 to reduce the pressure lower than that in the plasma cell, since the inner space of the plasma cell expands, stresses exert on the frit seal of the microsheet glass 103 to cause cracking.

SUMMARY OF THE INVENTION

It is, accordingly, an object of the present invention to overcome the foregoing problems in the related art and provide a plasma display device capable of moderating stresses exerting on a microsheet glass and thereby preventing fracture of the microsheet glass upon evacuating a display cell upon conducting liquid crystal injection.

The foregoing object of the present invention can be attained in accordance with the present invention in a plasma addressed display device comprising; a display cell comprising a first substrate having transparent electrodes arranged in a column on an inner surface, a microsheet glass adhered spaced at a gap to the first substrate and a liquid crystal layer held in the gap; and a plasma cell comprising a second substrate having discharge electrodes arranged in a row and a plurality of barrier ribs on an inner surface and an ionizable gas sealed between the second substrate and the microsheet glass, wherein the second substrate is adhered to the lower surface of the microsheet glass by way of a bonding material disposed between barrier ribs situated to the outer side and barrier ribs situated to an inner side thereof, the first substrate is adhered to the upper surface of the microsheet glass by way of an adhesive material disposed being aligned with the bonding material, and the adhesive material has such a sealing width as extending over the sealing width of the bonding material and extending for the distance between the barrier rib situated outer side and the barrier rib situated inner side.

Preferably, the thickness of the bonding material is made smaller than the height of the barrier rib of the plasma cell, and the thickness of the adhesive material is made greater by so much than the gap of the display cell.

In the present invention, the sealing width of the adhesive material used for assembling the display cell is made so as to extend over the sealing width of the bonding material used for assembling the plasma cell. Further, the sealing width of the adhesive material is made so as to extend for the distance gap between the outer barrier rib and inner barrier rib disposed in the plasma cell. That is, for compensating the strength of the microsheet glass, the position for coating the adhesive material disposed on the side of the display cell is improved such that the adhesive material extends over the bonding material on the side of the plasma cell as far as the vicinity of the outer barrier rib. This enables to moderate stresses exerting on the microsheet glass by the adhesive material itself when the inside of the display cell is evacuated for liquid cell injecting.

DESCRIPTION OF A PREFERRED EMBODIMENT

The present invention will be explained specifically by way of a preferred embodiment with reference to the drawings.

Figure 1:
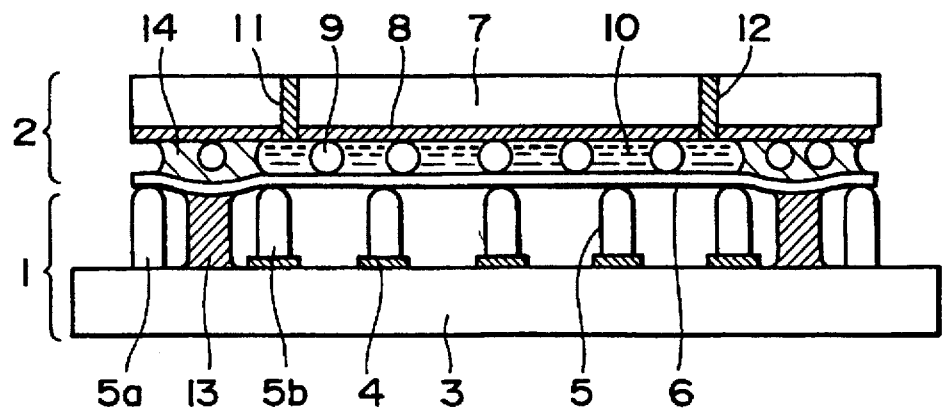
FIG. 1 is a cross sectional view illustrating a fundamental constitution of a plasma addressed display device according to the present invention.

FIG. 1 is a schematic cross sectional view illustrating a fundamental constitution of a plasma addressed display device according to the present invention. The plasma addressed display device has a flat panel structure comprising a plasma cell 1 and a display cell 2 stacked to each other.

The plasma cell 1 is constituted with a lower substrate 3 made, for example, of glass. Discharge electrodes 4 in a row and a plurality of barrier ribs 5 are formed to an inner surface of the lower substrate 3. The discharge electrode 4 is formed, for example, by screen printing and the barrier rib 5 is also formed by screen printing being stacked on the discharge electrode 4. The barrier rib 5 may be formed on the lower substrate 3 so as to be situated between the discharge electrodes 4. The lower substrate 3 is bonded by way of the barrier ribs 5 to the microsheet glass 6. The thickness of the microsheet glass 6 is about 50 μm. An ionizable gas is sealed at a pressure of about 100 Torr in the gap between the microsheet glass 6 and the lower substrate 3. On the other hand, the display cell 2 is constituted with an upper substrate 7 also made of glass or the like. Transparent electrodes 8 in the form of columns are formed to an inner surface of the upper substrate 7. The upper substrate 7 is adhered by a predetermined gap to the microsheet glass 6. Spacer particles 9 are previously dispersed in the gap. The size of the spacer particles is, for example, about 5 μm. A liquid crystal 10 is held in the gap. A pair of openings 11 and 12 are disposed to the upper substrate 7 for injecting the liquid crystal 10. After sealing the liquid crystal 10, the openings 11 and 12 are sealed by an adhesive material.

The lower substrate 3 is bonded to the lower surface of the microsheet glass 6 by way of a bonding material 13 made, for example, of glass frit disposed between a barrier rib 5a situated to an outer side and a barrier rib 5b situated to an inner side thereof. The height of the bonding material 13 is made lower than the height of the barrier rib 5 by way of a fusion process or the like for the glass frit. On the other hand, the upper surface 7 is adhered to an upper surface of the microsheet glass 6 by way of an adhesive material 14, for example, made of a UV-curable resin which is aligned with the bonding material 13. As a feature of the present invention, the sealing width of the adhesive material 14 is set so as to extend on both sides of the sealing width of the bonding material 13. Further, the sealing width of the adhesive material 14 is set to such an extent to extend for the width of the gap between the outer barrier rib 5a and the inner barrier rib 5b. In addition, the thickness of the adhesive material 14 is made larger than the size of the predetermined gap of the display cell 2 for compensating that the thickness of the bonding material 13 is smaller than the height of the barrier rib 5. Thus, the microsheet glass 6 slightly bend downwardly along the sealing region. However, since the adhesive material 14 has enough width and thickness, it can mechanically reinforce the bent portion of the microsheet glass 6 sufficiently.

Then, a method of manufacturing the plasma addressed display device will be explained with reference to FIG. 1.

In view of the step, the plasma cell 1 requiring a high temperature process is formed at first and then the display cell 2 is assembled thereon. In the final stage, the liquid crystal 10 is injected to the inner gap of the display cell 2.

In this case, the liquid crystal is injected by a method, for example, of evacuating the inside of the display cell 2 through the opening 11 on one side to about 0.1 Torr to establish a low vacuum condition, and then flowing liquid crystal 10 into the cell through the other opening 12.

In this step, the inner pressure in the liquid crystal 2 is made lower than the inner pressure in the plasma cell 1. Accordingly, the microsheet glass 6 undergoes a stress from the lower to the upper surfaces In this case, the periphery of the bent microsheet glass 6 is reinforced by the adhesive material 14 substantially completely. In other words, since the adhesive material 14 has a similar function with that of the spacer particles 9, if the microsheet glass 6 undergoes the stress due to the pressure difference, it is free from the worry of cracking.

The liquid crystal may be injected also by a method of simultaneously evaluating through the two openings and then simultaneously injecting the liquid crystal from the two openings.

Figure 2:
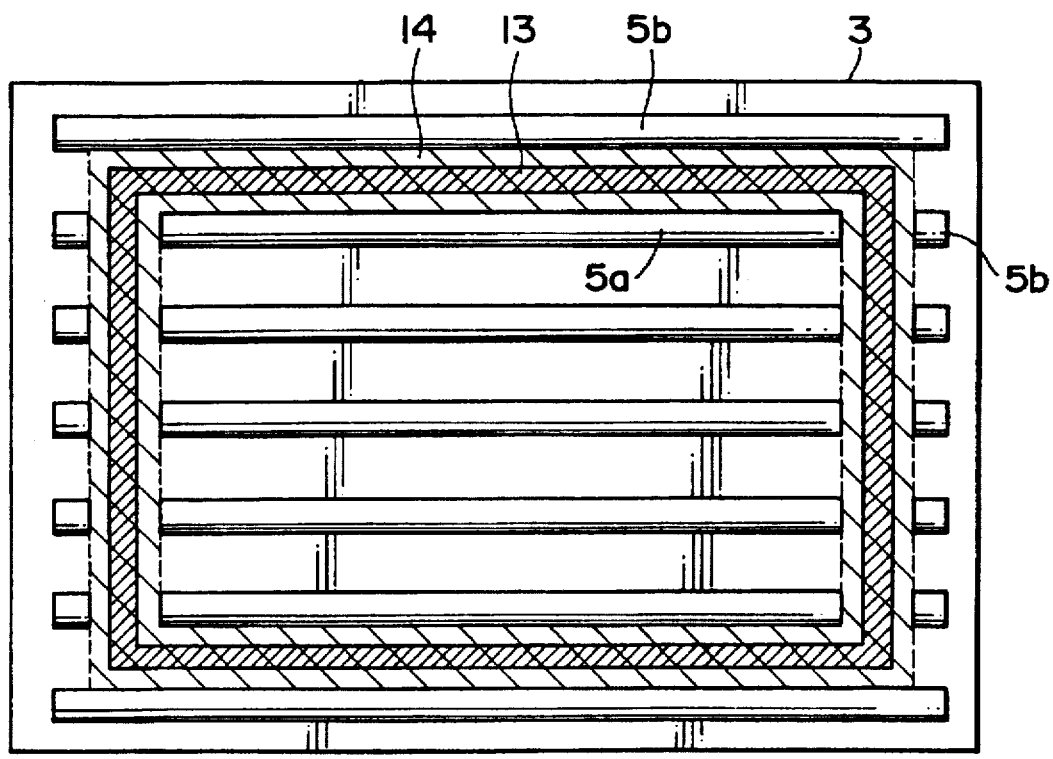
FIG. 2 is a schematic plan view of the plasma addressed display device according to the present invention.
Figure 3:
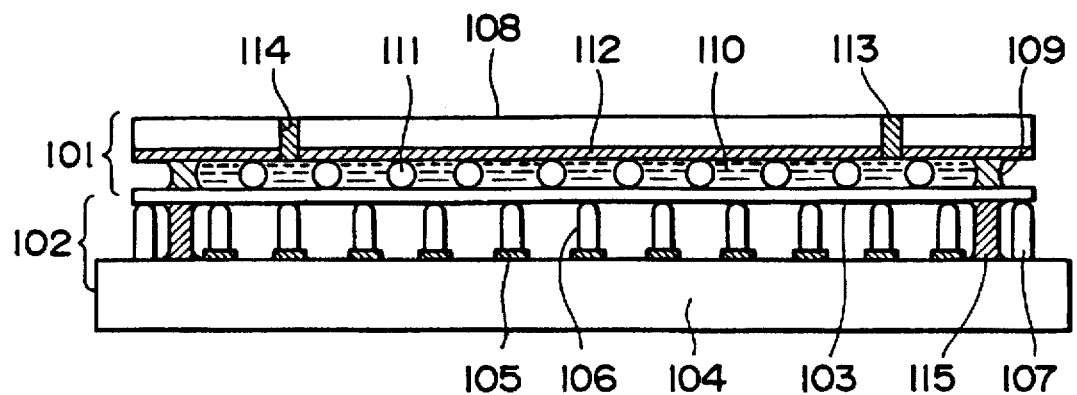
FIG. 3 is a cross sectional view illustrating an embodiment of a plasma addressed display device in related art.
Figure 4:
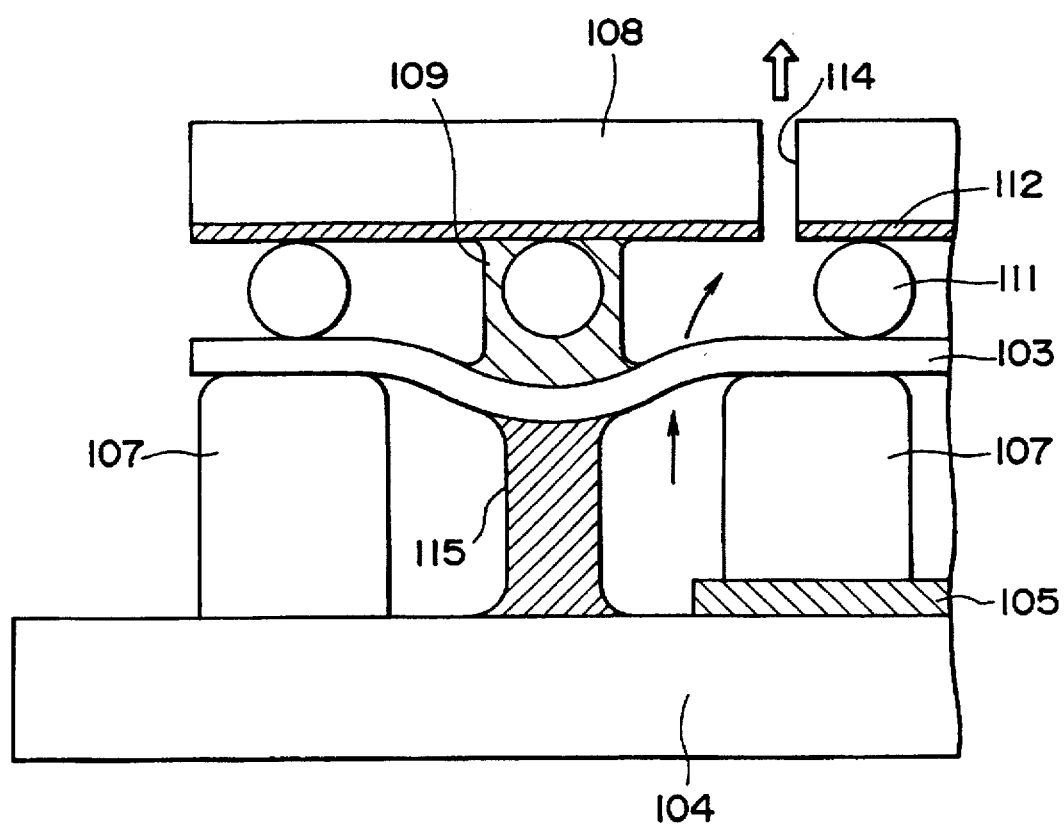
FIG. 4 is a schematic enlarged cross sectional view for a portion of a plasma addressed display device of the related art for the explanation of the problem.

Finally, a planer pattern shape of the lower substrate 3 is explained with reference to FIG. 2.

As described previously, the barrier ribs 5 are formed in a stripe pattern to the lower substrate 3, being aligned with discharge electrodes (not illustrated). The barrier ribs are separated into the inner barrier ribs 5a and the outer barrier ribs 5b with the bonding material 13 as a boundary. The inner barrier ribs 5a situate in a central effective screen, while the outer barrier ribs 5b situate in the peripheral ineffective screen.

One barrier rib is separated by a notch into the inner barrier rib 5a and the outer barrier rib 5b with respect to the right-to-left direction of the under substrate 3. The bonding material 13, for example, made of glass frit is disposed along the separation region. Further, for making the relation of arrangement with respect to the bonding material 13, the adhesive material 14 is shown by hatched lines. As is apparent from FIG. 2, the sealing width of the adhesive material 14 is set so as to extend over the sealing width of the bonding material 13. Further, the sealing width of the adhesive material 14 is set so as to extend for the gap between the outer barrier rib 5b and the inner barrier rib 5b.

As has been described above, in the plasma addressed display device according to the present invention, the position for coating the adhesive material disposed on the side of the display cell is improved such that the adhesive material extends as far as the vicinity of the outer barrier rib in the ineffective screen area while extending over the bonding material disposed on the side of the plasma cell, to compensate the strength of the microsheet glass.

This makes the microsheet glass free from rupture even if the vacuum degree in the display cell is made higher for removing residual bubbles upon injection of the liquid crystal. Namely, the sealing width and the sealing thickness of the adhesive material are set properly to moderate the stress exerting on the microsheet glass upon evacuation for the injection of the liquid crystal.

What is claimed is:

1. A plasma addressed display device, comprising;
    a display cell comprising a first substrate having transparent electrodes arranged in a column direction on an inner surface, a microsheet glass adhered spaced at a gap to the first substrate and a liquid crystal layer held in the gap; and
    a plasma cell comprising a second substrate having discharge electrodes arranged in a row direction and a plurality of barrier ribs to an inner surface and an ionizable gas sealed between the second substrate and the microsheet glass, wherein
    said second substrate is adhered to a lower surface of the microsheet glass by a bonding material disposed between barrier ribs situated to an outer side and barrier ribs situated to an inner side thereof, said bonding material extending between said second substrate and said microsheet glass,
    said first substrate is adhered to an upper surface of the microsheet glass by an adhesive material disposed in alignment with the bonding material, and
    said adhesive material being of a sealing width at least as great as a sealing width of the bonding material and said sealing width of said adhesive material extending for a distance between the barrier rib situated to said outer side of said bonding material and the barrier rib situated to said inner side of said bonding material.

2. A plasma addressed display device as defined in claim 1, wherein the bonding material is of a thickness in a direction perpendicular to said microsheet glass that is smaller than a height of the barrier ribs of the plasma cell.

3. A plasma addressed display device as defined in claim 2, wherein the adhesive material has a thickness in a direction perpendicular to said microsheet glass greater than the gap of the display cell.

4. A plasma addressed display device as defined in claim 1, wherein the barrier rib is formed on the discharge electrode so as to be aligned with the discharge electrode.

5. A plasma addressed display device as defined in claim 1, wherein the barrier rib is formed between the discharge electrodes.

6. A plasma addressed display device as defined in claim 1, wherein the adhesive material is made of a UV-curable adhesive material.

7. A plasma addressed display device as defined in claim 1, wherein the bonding material is made of glass frit.

8. A plasma addressed display device as defined in claim 1, wherein the display cell has spacer particles dispersed in the gap.

* * * * *